United States Patent [19]

Hofrichter

[11] Patent Number: 4,705,256
[45] Date of Patent: Nov. 10, 1987

[54] SWIVEL SEAT PEDESTAL
[75] Inventor: James Hofrichter, Reedsburg, Wis.
[73] Assignee: Seats, Inc., Reedsburg, Wis.
[21] Appl. No.: 889,798
[22] Filed: Jul. 23, 1986
[51] Int. Cl.[4] ............................................. F16M 13/00
[52] U.S. Cl. .................................... 248/418; 248/425; 248/349; 297/349
[58] Field of Search ............... 248/646, 652, 658, 664, 248/131, 415–418, 425, 186, 349; 297/349; 108/142, 139, 103

[56] References Cited

U.S. PATENT DOCUMENTS

| Re. 17,680 | 5/1930 | Smelker | 297/349 |
|---|---|---|---|
| 1,666,392 | 4/1928 | Masury | 248/418 |
| 1,711,268 | 4/1929 | Kilburn | 297/349 |
| 1,735,320 | 11/1929 | Kilburn | 297/349 |
| 2,876,051 | 3/1959 | Fox | 248/425 |
| 2,914,793 | 12/1959 | McMahan | 297/349 |
| 2,935,288 | 5/1960 | Summerer | 248/349 |
| 3,096,964 | 7/1963 | Fox | 248/417 |
| 3,113,804 | 12/1963 | Ritter | 297/349 |
| 3,570,800 | 3/1971 | Cycowicz | 248/415 |
| 3,637,185 | 1/1972 | Mikos | 248/417 |
| 3,653,340 | 4/1972 | Bugg | 248/425 |
| 3,724,798 | 4/1973 | Lucasey | 248/418 |
| 3,860,283 | 1/1975 | Colautti | 248/425 |
| 3,931,949 | 1/1976 | Waligorski | 108/142 |
| 4,098,485 | 7/1978 | Mizelle | 248/425 |
| 4,226,398 | 10/1980 | Freber | 248/415 |
| 4,410,159 | 10/1983 | McVicker | 248/425 |
| 4,436,270 | 3/1984 | Muraishi | 248/416 |
| 4,549,710 | 10/1985 | Prince | 248/349 |
| 4,570,997 | 2/1986 | Tanizaki | 248/425 |

Primary Examiner—J. Franklin Foss
Assistant Examiner—Robert A. Olson
Attorney, Agent, or Firm—Allegretti, Newitt, Witcoff & McAndrews, Ltd.

[57] ABSTRACT

An improved swivel seat pedestal is disclosed. The pedestal has a swivel plate rotatable about a pivot pin secured to a fixed base plate. Two bearing clamps are secured to the underside of the swivel plate and extend under the base plate to add lateral bending, and torsional stability to the pedestal. A stop clamp is mounted under the base plate to limit rotation of the swivel plate to a predetermined range.

14 Claims, 6 Drawing Figures

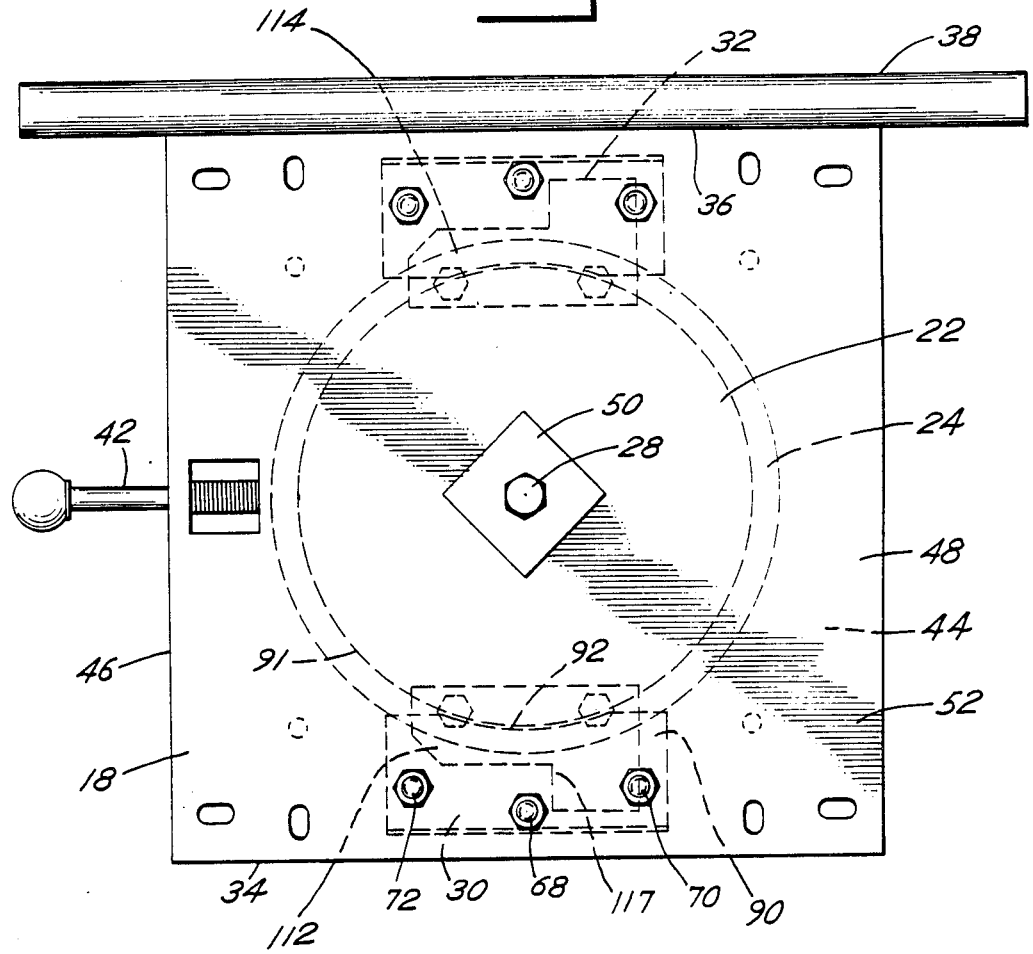
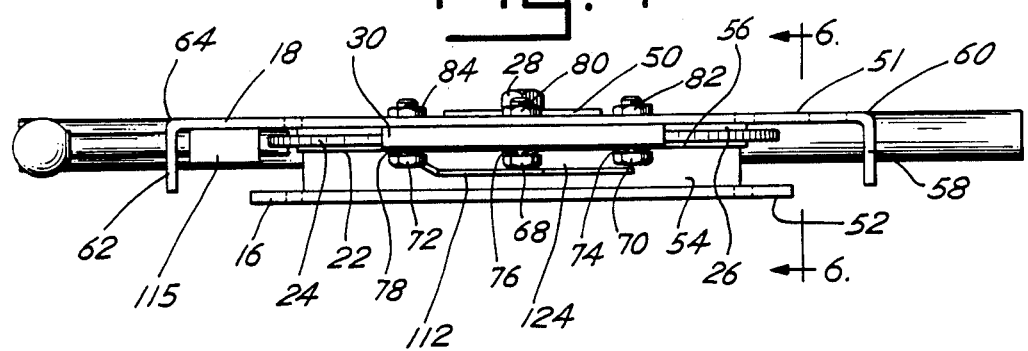

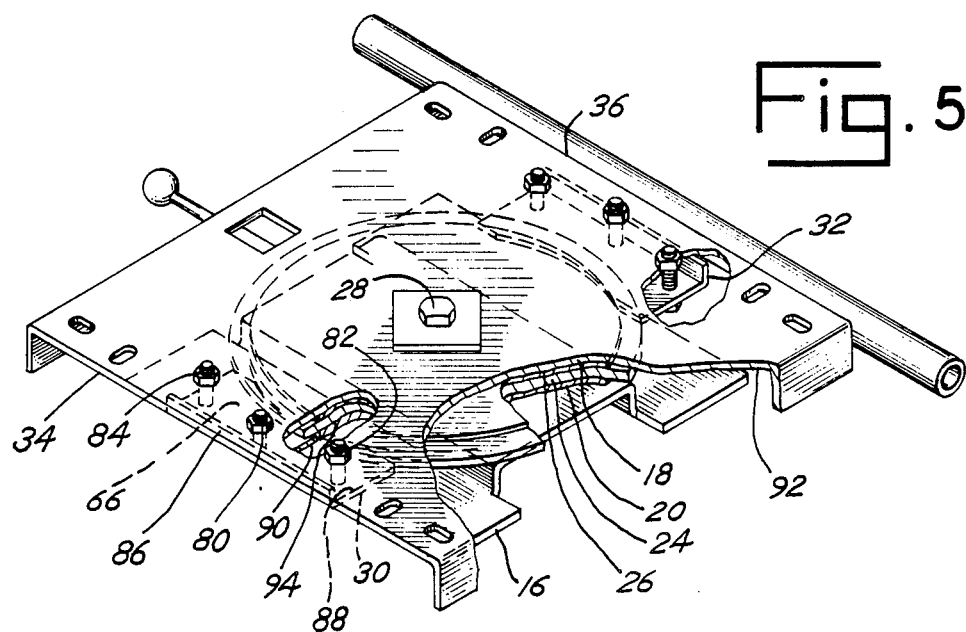
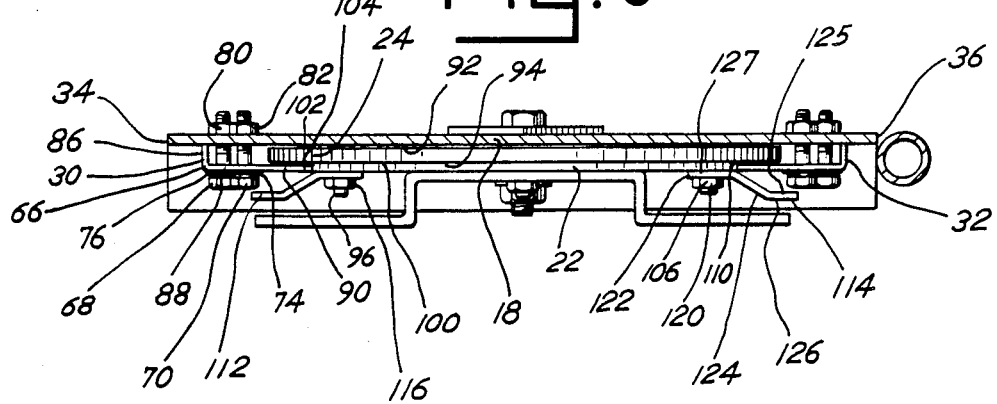

SWIVEL SEAT PEDESTAL

BACKGROUND

This invention relates to an improved swivel seat pedestal for use on moveable apparatus. More particularly, this invention relates to a swivel seat pedestal safely usable on industrial and commercial machinery of the type on which an operator's seat is subjected to severe vibrations during use of the machinery.

On industrial machinery, the operator's seat is often subject to a variety of forces, including severe vibration, vertical and lateral jarring, and torsional loads from the operator's constantly shifting weight. These forces sometimes cause significant stress on the support structure for the seat.

For fixed, non-rotatable seats, this vibration is not difficult to safely accommodate. The seat can easily be rigidly and safely secured to the support structure in many well known ways. Similarly, a seat belt, if required, can easily be rigidly and safely secured to either the non-rotatable seat or directly to the support structure.

Frequently, however, the operator's seat should be rotatable so the operator can rotate the seat to accomplish different tasks on the machinery. This necessarily complicates the design of the seat if the seat, while rotatable, is to remain capable of withstanding severe vibration, shock, and torsion.

One popular prior art swivel seat for industrial machinery has a swivel plate mounted on a pivot bolt secured to a supporting, rigid base plate. Polyethylene sheet is sandwiched between the plates to reduce friction.

Although this swivel seat is economical and easy to manufacture, it depends entirely on the pivot bolt to provide lateral stability to the seat. Thus, the single pivot bolt must accommodate and transfer to the support structure all the lateral vibration and shock loads placed on the seat as well as bending loads on the bolt caused by the constantly shifting weight of the operator on the seat or against the seat belt, if secured to the swivel plate.

Another type of prior art seat uses both a central pivot bolt and a bearing and race mechanism to support a swivel plate on a base plate. Although the pivot bolt and bearing and race system provides both rotatability and greater lateral and torsional stability to the seat, it is also relatively expensive to manufacture and difficult to assemble.

Other bearing and race supported seats are shown in U.S. Pat. Nos. 1,711,268, 1,735,320, and 3,570,800. For example, U.S. Pat. No. 1,711,268, to Kilburn, shows a rotatable seat for use on a railcar. This seat provides lateral and torsional stability by (i) a bearing and race support structure, (ii) a center pin, (iii) two interengaging flanges, one secured to the swivel plate and the other to the base plate, and (iv) arm rest supports secured to a wall of the railcar.

The result is that these seats in the prior art have been either (a) relatively inexpensive and easy to manufacture, but dependent on a single pivot pin to provide lateral stability, or else (b) more complicated, expensive, and difficult to assemble.

It is therefore an object of the present invention to provide a swivel seat pedestal that is relatively inexpensive and easy to manufacture than the seats in the prior art. Another object is to provide a swivel seat pedestal that is not solely dependent on a single pivot bolt to provide lateral stability to the seat under severe conditions. Yet another object is to simultaneously provide such a seat with greater torsional stability than that provided by seats with the single pivot bolt for lateral stability.

A further object of this invention is to provide a swivel seat pedestal that is less complicated than the pedestals of the prior art and is, preferably, without a bearing or race mechanism. An additional object is to provide a swivel seat pedestal that can safely accommodate a seat belt secured to the rotatable seat rather than the support apparatus.

There are other objects and advantages of the present invention. They will become apparent as the specification proceeds.

SUMMARY OF THE INVENTION

Briefly, the foregoing and other objects are attained by my invention of an improved swivel seat pedestal having a seat support, a circular base plate secured to the support, and a swivel plate rotatably secured to the base plate and supporting a seat above the base plate. At least one bearing clamp (preferably two) is (are) secured to swivel plate. Each bearing clamp has a bearing lip extending adjacent the side of the base plate opposite the side facing the swivel plate. In this manner, loads placed on the swivel plate are transferrable through the bearing clamp to the base plate and from the base plate to the support means.

In the preferred embodiment, the bearing clamp includes an angled bracket having a bearing lip, a separating flange perpendicular to the bearing lip, and a fastener passage portion intermediate the separating flange and the bearing lip. The fastener passage portion has at least three triangularly spaced fastener passages; and each such passage has a threaded fastener penetrating the fastener passage and secured to the swivel plate. Spring washers on each fastener simultaneously urge the fastener passage portion toward the swivel plate along the axis of each fastener, thus maintaining the bearing lip in position adjacent to but spaced from the side of the base plate opposite the side facing the swivel plate.

BRIEF DESCRIPTION OF THE DRAWINGS

The preferred embodiment of the present invention is shown in the accompanying drawings wherein:

FIG. 3 is an elevational view of the improved swivel seat pedestal with the seat removed;

FIG. 4 is a side plan view of the improved swivel seat pedestal with the seat removed;

FIG. 5 is a perspective view of the improved swivel seat pedestal with the seat removed and with three partial cutaways revealing the arrangement of the components; and FIG. 6 is a sectional view of the improved swivel seat pedestal taken along section line 6—6 of FIG. 4.

DETAILED DESCRIPTION OF THE PREFERRED EMBODIMENT

Figure 1:
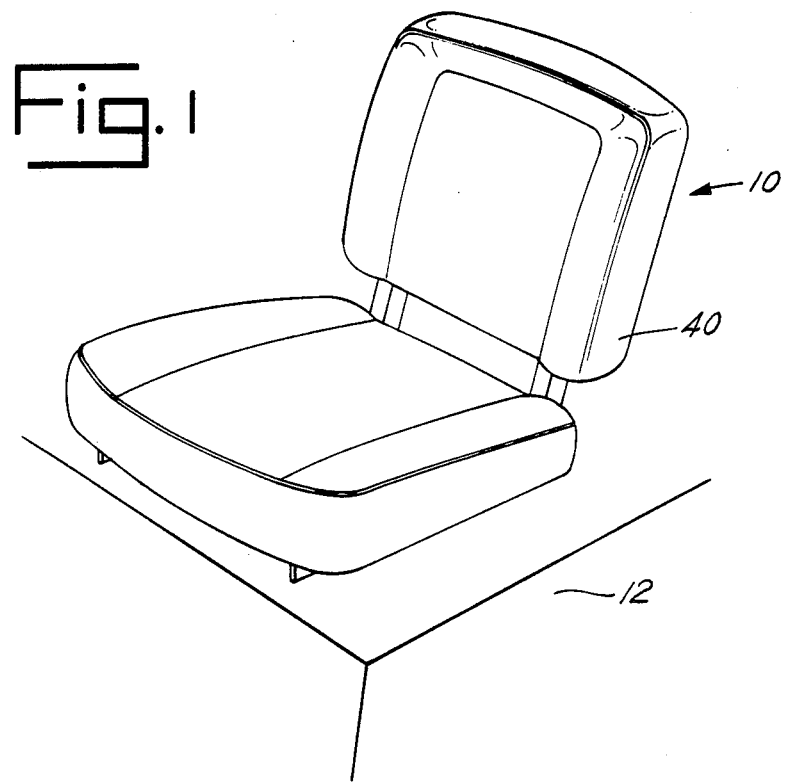
FIG. 1 is a perspective view of the improved swivel seat on the support platform of a vehicle.
Figure 2:
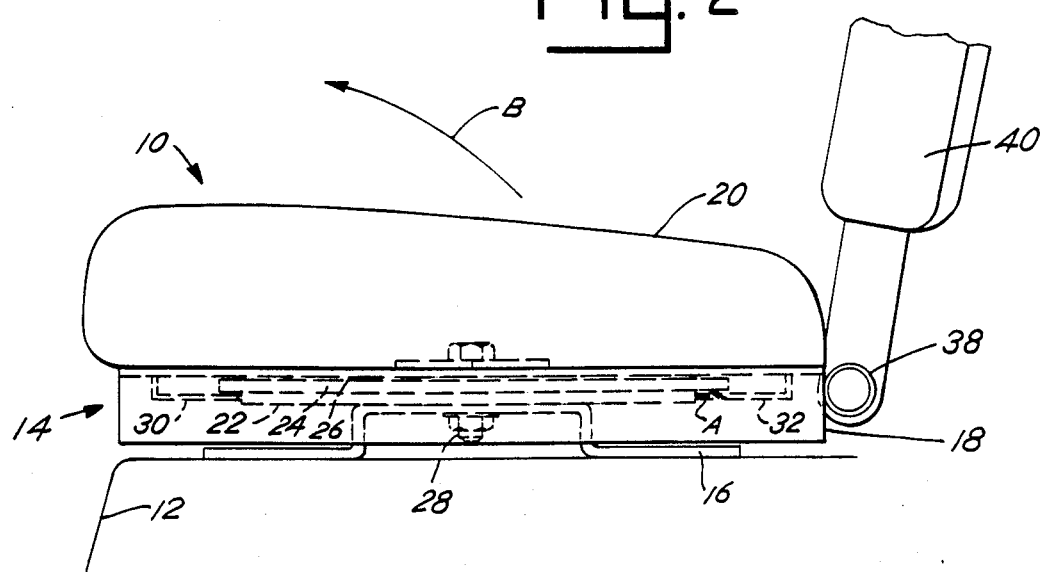
FIG. 2 is a plan view of the improved swivel seat pedestal supporting the swivel seat on the platform of the vehicle.

Referring to FIG. 1, the preferred embodiment of the improved swivel seat pedestal supports a swivel seat, generally 10, on a support platform 12 of an industrial vehicle. As shown in FIG. 2, the swivel seat pedestal, generally 14, has:

1. a rectangular steel support plate 16 bolted to the support platform 12;
2. a circular steel spacer plate 22 welded to the top of the support plate 16;
3. a circular steel base plate 24 bolted to the top of the spacer plate 22;
4. a circular polyethylene bearing sheet 26 mounted over the base plate 24; and
5. a rectangular steel swivel plate 18 mounted over the bearing sheet 26 and supporting a padded seat 20 secured thereto.

The spacer plate 22, base plate 24, bearing sheet 26, and swivel plate 28 are all mounted on the support plate 16 about a central pivot bolt 28 passing through coaxial passages (not shown) in each plate 22, 24, 18, 16, and the sheet 26.

In certain of the prior art constructions described above, the pivot bolt 28 would bear virtually all lateral loads (see Arrow A) as well as substantial torsional and bending loads (see Arrow B) placed on the pedestal 14. In the present invention, however, bearing clamps, generally 30, 32, are secured to the swivel plate 18 to bear some of these loads and reduce the possibility of bending or failure of the pivot bolt 28.

Referring now to FIG. 3, the swivel plate 18 is generally square with a forward edge 34, a rear edge 36, a top side 48, and a bottom side 44. A seamless steel tube 38 is welded to the rear edge 36, and a seat belt (not shown) and, as shown in FIGS. 1 and 2, a seat back 40 may be mounted on this tube 38.

In addition, in the preferred embodiment, an adjustable seat lock 42 is mounted on the bottom side 44 adjacent a side edge 46 of the swivel plate 18. The seat lock 42 engages the periphery of the base plate 24 to lock the rotatable base plate 24 in the desired position.

A reinforcing steel square 50 is mounted directly above the center of the swivel plate 18 on the upper side 51 of the swivel plate 18. Both the square 50 and the swivel plate 18 have a coaxial pivot pin passage (not shown) having approximately the same diameter as the shank of the pivot pin 28 penetrating the coaxial passages.

Referring now to FIG. 4, the support plate 16 has a lower flange plate 52 bolted to the support platform 12 and an upper support box 54 extending from the lower flange plate 52. The support box 54 has a square upper surface 56, and the diagonal width of the square upper surface 56 is somewhat less than the diameter of the spacer plate 22 welded to the upper surface 56. In turn, the diameter of the base plate 24, bolted to the spacer plate 22, is substantially greater than the diameter of the spacer plate 22, while the diameter of the bearing sheet 26 is slightly less than the diameter of the base plate 24 immediately below the sheet 26. Finally, the width of the swivel plate 18 is significantly greater than the diameter of both the bearing sheet 26 and the base plate 24.

As also shown in FIG. 4, the swivel plate has a left downward flange 58 at the left side 60 and a right downward flange 62 on the right side 64. The downward flanges 58 and 62 add strength and rigidity to the swivel plate 18.

Referring now to FIGS. 4 and 6, the preferred embodiment utilizes two bearing clamps 30, 32, one near the forward edge 34 and the other near the rear edge 36. Each bearing clamp 30, 32 consists of a steel angled bearing 66, three steel bearing bolts 68, 70, 72, three steel spring washers 74, 76, 78, and three steel bearing bolt nuts 80, 82, 84. The angled bearing 66 has a planar separating flange 86 vertically and perpendicularly extending from a horizontal, planar fastener passage portion 88, and a planar bearing lip 90 horizontally extending from the passage portion 88 parallel to the planar bottom sides 92, 94 of the swivel plate 18 and base plate 20, respectively.

Referring back to FIG. 3, the bearing lip 90 has a circular detent 92 having a radius approximately equal to the radius of the planar spacer plate 22. As a result, the bearing lip 90 is positioned slightly spaced from the circumferential periphery 91 of the spacing plate 22.

Referring again to FIGS. 4 and 6, the base plate 24 has two front steel stud bolts 96, 98 (98 not shown) pressed into front stud sockets (not shown) in the forward portion 104 of the bottom side 94 of the base plate 24 and two rear steel stud bolts 106, 108 (108 not shown) pressed into rear stud sockets (not shown) in the rear portion 110 of the bottom side 94 of the base plate 24. All the stud bolts 96, 98, 106, 108 extend perpendicularly from the side 100 of the base plate 24 opposite the side 102 facing the swivel plate 18. The stud bolts 96, 98, 106, 108 pass through coaxial stud passages (not shown), respectively, in the spacer plate 22 immediately below the base plate 24.

The forward pair of stud bolts 96, 98 penetrate coaxial clamp passages (not shown) in a front angled stop clamp 112, and the rear pair of stud bolts 106, 108 penetrate coaxial rear clamp passages (not shown) in a rear angled stop clamp 114. Stud nuts 116, 118, 120, 122 (118 and 122 not shown) thread the stud bolts 96, 98, 106, 108, respectively, to secure the angled stop clamps 112, 114 to the side of the spacer plate 22 opposite the side facing the base plate 24. The range of rotation of the swivel plate 18 is limited to the range of rotation that the stop clamps 112, 114 allow of the lock pin housing 115. That is, as the lock pin housing 115 rotates, its rotation will cease when the lock pin housing 115 collides with the stop protrusion 117 of the stop clamps 112, 114. In this manner, they prevent the operator from rotating the seat 10 into an unsafe or unintended position.

Both of the stop clamps 112, 114 are of identical construction. Each is made of steel, and as shown in FIG. 6 for the rear clamp 114, each has (i) a planar bolted section 122, (ii) a stop section 124 extending from, and at an acute angle to the plane of, the bolted section 122, and (iii) a planar extension section 126 extending from, and at an obtuse angle to, the stop section 124 and parallel to the plane of the bolted section 122. The distance between the upper side 125 of the extension section 126 and the upper side 127 of the bolted section 122 is somewhat greater than the combined axial height of the head of the bearing bolts, e.g., 68, and the spring washers, e.g., 74.

Referring back to FIG. 4, the width and exact structure of the stop section 124 is dependent on the range of rotatability intended for the swivel plate 18. For example, by increasing the width of the stop section 124 in the plane of the spacer plate 22 and securing the stop clamp 112 closer to the pivot pin 28, the range of rotatability is increased.

With reference now to FIG. 5, the swivel plate 18 is rotatable about the pivot pin 28 with respect to the rigidly inter-connected base plate 24, spacer plate 20, and support plate 16. The bearing sheet 26 is sandwiched between the swivel plate 18 and base plate 24 to reduce friction and wear, and bearing bolts 80, 82, 84 are tightened against the spring washers (see 74, 76 of FIG. 6) to position the bearing lips 90 of the bearing clamps 30, 32 parallel and adjacent to, and slightly vertically spaced from, the bottom side 94 of the base plate 94.

In this regard, the triangular arrangement of the bearing bolts 80, 82, 84 and their spring washers cooperatively provide a means of adjusting the position of the fastener passage portion 88 and the bearing lip 90 of the bearing 66 in the plane formed by the triangular arrangement of the bolts 80, 82, 84 and their spring washers. At the same time, tightening of the bearing bolts 80, 82, 84 against the fastener passage portion 88 forces the flange portion 86 of the bearing 66 firmly and rigidly against the bottom side 92 of the swivel plate 18. In this way, the bearing bolts 80, 82, 84, their spring washers, and the flange portion 86 and fastener portion 88 of the bearing 66 cooperatively provide means for maintaining the position of the bearing lip 90 adjacent, parallel to, and slightly spaced from, the bottom side 94 of the base plate 24.

The resulting swivel seat pedestal 14 is not solely dependent on the pivot pin 28 for lateral and bending stability between the critical juncture of the base plate 24 and swivel plate 18. Both bending and lateral forces on the swivel plate 18 can also be borne by the bearing clamps 30, 32. Torsional and bending forces on the swivel plate 18 will cause the bearing lip, e.g., 90, to engage, and thus transfer the forces to, the bottom side 94 of the base plate 24. And lateral forces on the swivel plate 18 can, when sufficiently great, cause the circumferential periphery of the spacer plate 20 to engage, and thus transfer the lateral force to, the spacer plate 20.

In the preferred embodiment, the bearing clamps 30, 32 are located at the front and rear of the swivel plate 18 in order to most effectively transfer bending and lateral force of a seat belt to the support plate 16. Since the seat belt is preferrably secured to the swivel plate 16 at the rear edge 36, the bending and lateral forces of the seat belt will most likely be along a line from the rear edge 36 to the forward edge 34 of the swivel plate.

It can thus be seen that the preferred embodiment described above provides a swivel seat pedestal that is relatively inexpensive and easy to manufacture without being dependent solely on a single pivot bolt to provide lateral stability to the seat under severe conditions. Moreover, the pedestal described has much greater torsional, bending, and lateral stability than that provided by prior art swivel seats having a single pivot bolt.

At the same time, the invention set forth does not require a bearing or race mechanism to provide ample lateral, bending, and torsional stability to safely accommodate a seat belt secured to the rotatable seat rather than the support apparatus.

While in the foregoing I have described the preferred embodiment of my invention, the description is illustrative and not exclusive.

Instead, the scope of my invention is set forth in the following claims, in which what I claim is:

1. An improved swivel seat pedestal of the type usable on a apparatus moveable, the improved swivel seat pedestal including in combination:
   (a) seat support means for supporting a seat on the moveable apparatus;
   (b) a circular base plate secured to the support means and having a forward edge and a rearward edge;
   (c) a swivel plate;
   (d) rotation means for rotatably securing the swivel plate to the base plate;
   (e) a seat mounted on the side of the swivel plate opposite the side facing the base plate;
   (f) at least a first bearing clamp secured to swivel plate and having a first bearing lip extending adjacent the base plate whereby loads placed on the swivel plate are transferrable through the bearing clamp to the base plate and from the base plate to the support means.

2. The improved swivel seat pedestal of claim 1 also including a second bearing clamp secured to the swivel plate but being diametrically opposed to the first bearing clamp about the axis of rotation of the swivel plate, the second bearing clamp having a second bearing lip extending adjacent the base plate.

3. The improved swivel seat pedestal of claim 1 wherein:
   (1) the swivel plate has (i) a central axis of rotation and (ii) a diametral width centered at the central axis and being substantially greater than the diameter of the base plate;
   (2) the central axis of the swivel plate is coaxial with the axial center of the base plate;
   (3) the bearing clamp is mounted on the side of the swivel plate facing the base plate at a distance from the central axis greater than the radius of the base plate.

4. The improved swivel seat pedestal of claim 3 wherein the bearing clamp further includes:
   (1) an angled bearing having a bearing lip, a separating flange perpendicular to the bearing lip, and a fastener passage portion intermediate the separating flange and the bearing lip and having at least one fastener passage passing therethrough;
   (2) at least one threaded fastener penetrating the fastener passage and secured to the swivel plate; and
   (3) at least one spring means for urging the bearing lip of the angled bearing adjacent the side of the base plate opposite the side facing the swivel plate.

5. The improved swivel seat pedestal of claim 3 wherein the bearing clamp includes:
   (1) an angled bearing having the bearing lip, a separating flange perpendicular to the bearing lip, and a fastener passage portion intermediate the separating flange and the bearing lip, the fastener passage portion having at least three fastener passages triangularly spaced from one another;
   (2) a fastener penetrating each fastener passage and having a fastener head, an intermediate rod extending from the head through the fastener passage, and a secured portion extending from the rod and secured to the swivel plate; and
   (3) a spring washer intermediate each fastener head and the fastener passage portion of the angle bearing, to urge the fastener passage portion toward the swivel plate along the axis of the intermediate rod of the fastener.

6. The improved swivel seat pedestal of claim 2 wherein:

(1) the swivel plate has (i) a central axis of rotation and (ii) a diametral width centered at the central axis and being substantially greater than the diameter of the base plate;

(2) the central axis of the swivel plate is coaxial with the axial center of the base plate; and (3) each bearing clamp is mounted on the side of the swivel plate facing the base plate at a distance from the central axis greater than the radius of the base plate.

7. The improved swivel seat pedestal of claim 6 wherein each bearing clamp further includes:

(1) an angled bearing having the bearing lip, a separating flange perpendicular to the bearing lip, and a fastener passage portion intermediate the separating flange and the bearing lip and having at least one fastener passage passing therethrough;

(2) at least one threaded fastener penetrating the fastener passage and secured to the swivel plate; and (3) at least one spring means for urging bearing lip of the angled bearing adjacent the side of the base plate opposite the side facing the swivel plate.

8. The improved swivel seat pedestal of claim 6 wherein each bearing clamp includes:

(1) an angled bearing having the bearing lip, a separating flange perpendicular to the bearing lip, and a fastener passage portion intermediate the separating flange and the bearing lip, the fastener passage portion having at least three fastener passages triangularly spaced from one another;

(2) a fastener penetrating each fastener passage and having a fastener head, an intermediate rod extending from the head through the fastener passage, and a secured portion extending from the rod and secured to the swivel plate; and (3) a spring washer intermediate each fastener head and the fastener passage portion of the angle bearing, to urge the fastener passage portion toward the swivel plate along the axis of the intermediate rod of the fastener.

9. The improved swivel seat pedestal of claim 4, 5, 6, 7 or 8 also including (i) a stop abutment extending from the side of the swivel plate opposite the seat and (ii) at least one swivel motion stop at least one swivel motion stop clamp adjacent the edge of the base plate on the side of the base plate opposite the side facing the swivel plate, the stop clamp having a stop section extending downwardly from the base plate to provide means for limiting the range of rotation of the stop abutment and thus the swivel plate.

10. The improved swivel seat pedestal of claim 3, 4, 5, 6, 7, or 8 wherein the rotational means includes a pivot bolt interconnecting the swivel and base plates and wherein the pedestal also includes a friction reducing sheet between the swivel and base plates.

11. The improved swivel seat pedestal of claim 9 wherein the rotational means includes a pivot bolt interconnecting the swivel and base plates and wherein the pedestal also includes a friction reducing sheet between the swivel and base plates.

12. The improved swivel seat pedestal of claim 10 also having a seat belt and means for attaching the seat belt to the swivel plate whereby a load on the seat belt is transferred to the swivel plate and from the swivel plate to the base plate and the support means.

13. The improved swivel seat pedestal of claim 11 also having a seat belt and means for attaching the seat belt to the swivel plate whereby a load on the seat belt is transferred to the swivel plate and from the swivel plate to the base plate and the support means.

14. The improved swivel seat pedestal of claim 1, 2, 3, 4, 5, 6, 7, 8, 9, 10, 11, 12 or 13 wherein the swivel seat pedestal does not include a bearing and race mechanism.

* * * * *